(12) United States Patent
Abergel

(10) Patent No.: US 9,833,984 B2
(45) Date of Patent: Dec. 5, 2017

(54) METHOD AND SYSTEM FOR PREPARING SUBSTRATES BEFORE GOLD-PLATED

(71) Applicant: MGI FRANCE, Ivry sur Seine (FR)

(72) Inventor: Edmond Abergel, Paris (FR)

(73) Assignee: MGI FRANCE, Ivry sur Seine (FR)

( * ) Notice: Subject to any disclaimer, the term of this patent is extended or adjusted under 35 U.S.C. 154(b) by 32 days.

(21) Appl. No.: 14/897,401

(22) PCT Filed: Jun. 10, 2014

(86) PCT No.: PCT/EP2014/062005
§ 371 (c)(1),
(2) Date: Dec. 10, 2015

(87) PCT Pub. No.: WO2014/198711
PCT Pub. Date: Dec. 18, 2014

(65) Prior Publication Data
US 2016/0129682 A1    May 12, 2016

(30) Foreign Application Priority Data

Jun. 11, 2013 (EP) .................................... 13305787

(51) Int. Cl.
| | | |
|---|---|---|
| *B32B 38/00* | (2006.01) | |
| *B05D 1/26* | (2006.01) | |
| *B32B 37/14* | (2006.01) | |
| *B44C 1/14* | (2006.01) | |
| *B41M 3/00* | (2006.01) | |
| *B41M 7/00* | (2006.01) | |

(52) U.S. Cl.
CPC .............. *B32B 38/145* (2013.01); *B05D 1/26* (2013.01); *B32B 37/14* (2013.01); *B44C 1/14* (2013.01); *B32B 2309/105* (2013.01); *B41M 3/008* (2013.01); *B41M 7/00* (2013.01)

(58) Field of Classification Search
CPC .......... B32B 38/145; B32B 37/14; B05D 1/26
See application file for complete search history.

(56) References Cited

U.S. PATENT DOCUMENTS

2005/0167035 A1* 8/2005 Laskey ............... B32B 37/0076
156/230

FOREIGN PATENT DOCUMENTS

| CH | EP 1736324 A2 * | 12/2006 | ............... B44C 1/14 |
|---|---|---|---|
| EP | 1 736 324 A2 | 12/2006 | |
| IL | WO 2011110956 A2 * | 9/2011 | ............ B41F 19/062 |
| WO | 03/020519 A1 | 3/2003 | |

OTHER PUBLICATIONS

International Search Report for corresponding International Application No. PCT/EP2014/062005, dated Aug. 13, 2014.

* cited by examiner

*Primary Examiner* — Daniel Lee
(74) *Attorney, Agent, or Firm* — Hauptman Ham, LLP

(57) ABSTRACT

The invention concerns a method and/or a system for personalizing substrates and/or preparing substrates before gold-plating. In particular, the invention consists of a printing method comprising a step in which the substrate is subjected to inkjet printing followed by a gold-plating step in which the regions of the substrate to be gold-plated are brought into contact with the gold-plating leaf, characterized by an additional step performed prior to the gold-plating step and which consists in the preparation of the substrate.

15 Claims, 4 Drawing Sheets

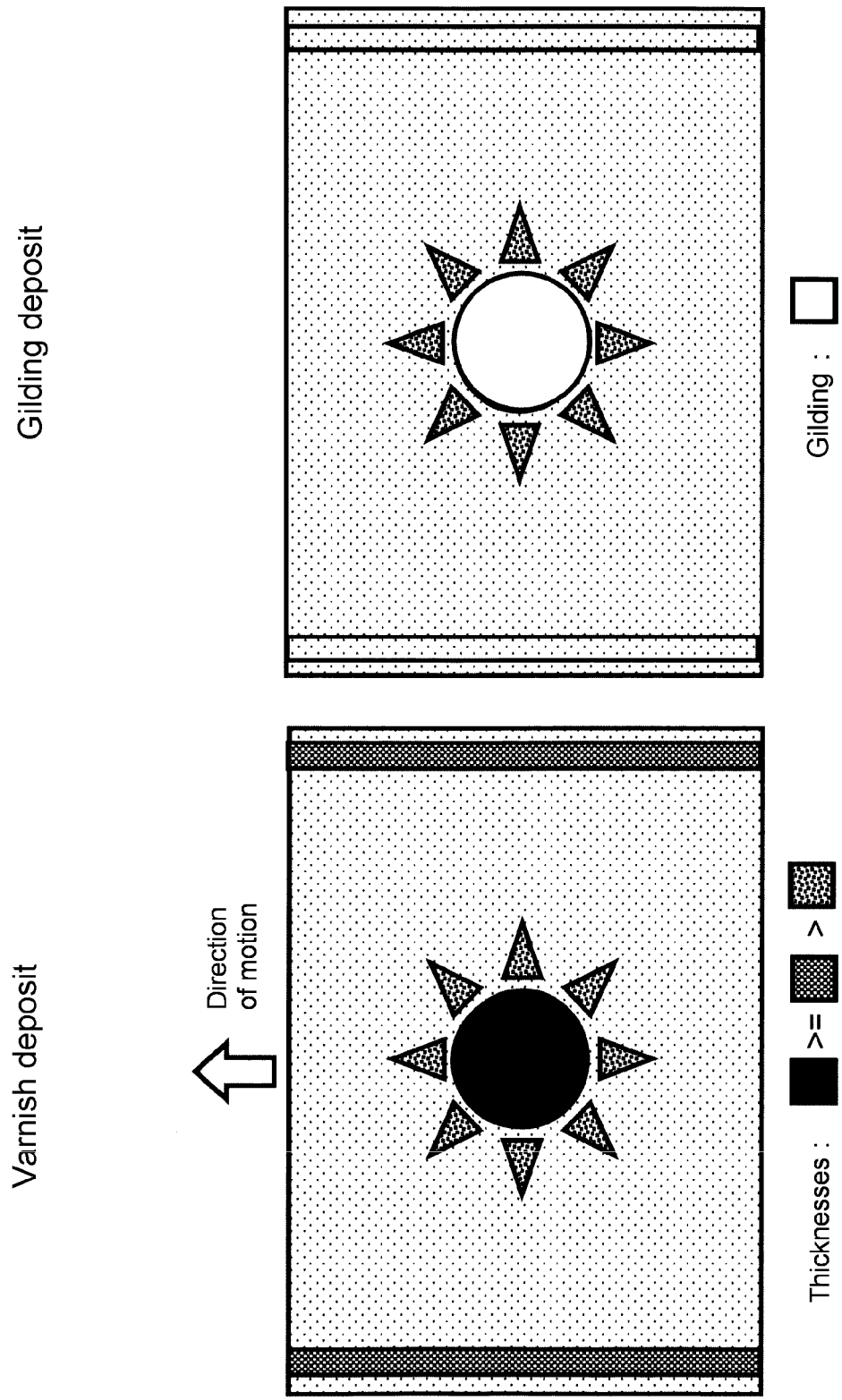

METHOD AND SYSTEM FOR PREPARING SUBSTRATES BEFORE GOLD-PLATED

TECHNICAL FIELD

The present invention relates to the field of customization devices of substrates. In this way, the invention relates especially to a method and/or a system for preparation of a substrate prior to the deposit of an additional coating (or material), generally called "gilding", and/or relates to a method and/or a "gilding" system of a substrate. In particular, the present invention relates especially to a printing method comprising a printing step of a substrate by inkjet followed by a "gilding" step by contact between the areas of the substrate to be gilded and a deposit device of "gilding", such as a gilding foil for example, in which the gilding step is preceded by preparation of the substrate.

Techniques for gilding of printed substrates are well known to the person skilled in the art. The basic principle of this technique is based on the action of depositing an additional coating (i.e. gilding or material) on the substrate, by a deposit "gilding" device, for example by applying/pressing a foil (bearing said coating or gilding) onto selected areas of the substrate so as to have the preferred part of the foil adhere to the selected areas. This technique can for example comprise depositing of adhesive on the substrate according to a predetermined pattern before the deposit of the customization coating (gilding foil for example) on the adhesive deposited on the substrate. Depositing of the adhesive can be done by means of one or more techniques, such as for example inkjet printing, toner-based printing, silkscreening or offset printing.

The present invention relates in particular to techniques of inkjet printing in relief, for example by means of piezoelectric printing heads, adapted as a function of the printing ink and/or varnish used.

PRIOR ART

The prior art discloses various solutions for customization of substrate by gilding and especially application WO2011110956, in its embodiment represented by its FIG. 2, describes a cold gilding system comprising a pressing system 200 and, upstream of this pressing system a printing section comprising a printing device 210 (for example, an inkjet printer) for depositing a deposit pattern constituted by a layer of adhesive 222 onto a substrate 220. After pressing of a foil onto the substrate, the adhesive is hardened and becomes adhesive, allowing the foil to adhere to the preset pattern.

Problem

Despite the evolution and precision of gilding techniques, the applicant discovered a problem linked to application of these techniques downstream of the inkjet relief printing techniques. In fact, when the areas of the printed substrate in relief are coated with a coating such as gilding, it often happens that the other areas of said substrate (i.e. those not intended to receive said coating) are contaminated by the gilding.

Solution/Invention

The aim of the present invention therefore is at least to eliminate this major drawback by proposing a printing method and/or a printing system comprising substrate printing by inkjet or customization of printed substrates, especially by inkjet, comprising at least one deposit of gilding, limiting (or eliminating) the risks of the gilding encroaching on the areas not intended to receive this gilding. In this perspective, some embodiments of the invention relate to preparation of a substrate with the view to a customization by gilding.

This aim is attained by a substrate preparation method and/or a printed substrate customization method, comprising at least one printing of at least one substrate, generally by inkjet, which puts in relief areas intended to be coated with gilding and a preparation of the substrate, the method being characterized in that it comprises addition of material to the substrate, preferably near the lateral edges of the substrate, prior to application of the gilding, so as to guide a gilding device depositing said material without contaminating the rest of said substrate.

The minimal thickness of the material added near the lateral edges of the substrate is generally of the order of a micron, for example greater than five microns, preferably greater than ten microns, or even greater than fifteen microns.

According to another particular feature, the thickness of the material added near the lateral edges of the substrate is calculated as a function of the value of the thickness of the relief of the areas intended to be coated with a gilding foil.

According to another particular feature, when the printed areas in relief comprise areas intended to be coated with a gilding foil as well as areas which are not, the thickness of the material added near the lateral edges of the substrate is calculated as a function of the value of the respective thickness of the relief of the different areas. A corresponding illustration is shown in FIG. 4.

According to another particular feature, the thickness of the material added near the lateral edges of the substrate is calculated as a function of the value of the thickness of the gilding foil.

According to another particular feature, the thickness of the material added near the lateral edges of the substrate is calculated as a function of the value of the thickness of the relief of the areas intended to be coated with a gilding foil and of the thickness of the gilding foil.

According to another particular feature, the thickness of the material added near the lateral edges of the substrate is calculated as a function of the value of the thickness of the relief of the areas intended to be coated with a gilding foil, of the value of the thickness of the relief of the areas which are not intended to be coated with a gilding foil and of the thickness of the gilding foil.

Finally, according to another particular feature, the thickness of the material added near the lateral edges of the substrate is less than the value of the minimal thickness of the relief of the areas intended to be coated with a gilding foil.

The invention, with its characteristics and advantages, will emerge more clearly from the following description, given in reference to the appended drawings, in which:

DESCRIPTION OF FIGURES

FIGS. 3a, 3b, 4a and 4b illustrate a substrate and gilding preparation according to some embodiments of the present invention.

DESCRIPTION OF PREFERRED EMBODIMENTS OF THE INVENTION

Figure 1:
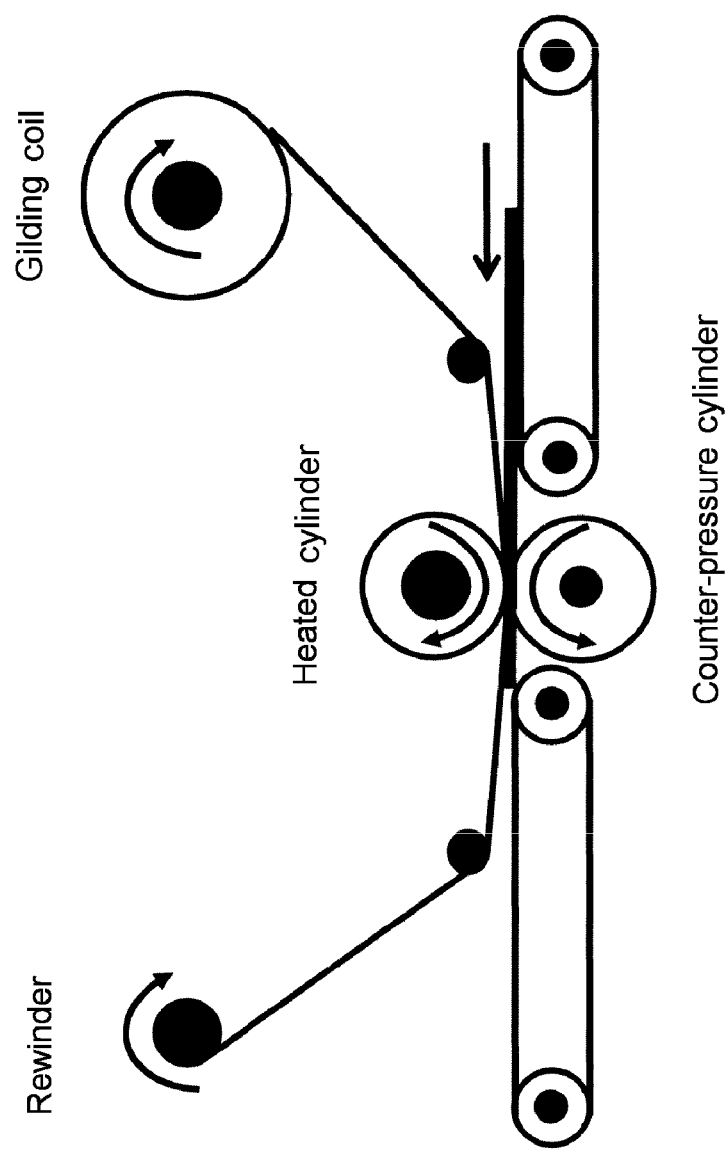
FIG. 1 illustrates a gilding technique according to some embodiments of the present invention.

By way of illustration and non-limiting, FIG. 1 illustrates a gilding technique which comprises the use of a heated cylinder and a counter-pressure cylinder between which the substrate and the gilding foil are put into contact. A gilding coil and the rewinder are also shown here.

Figure 2:
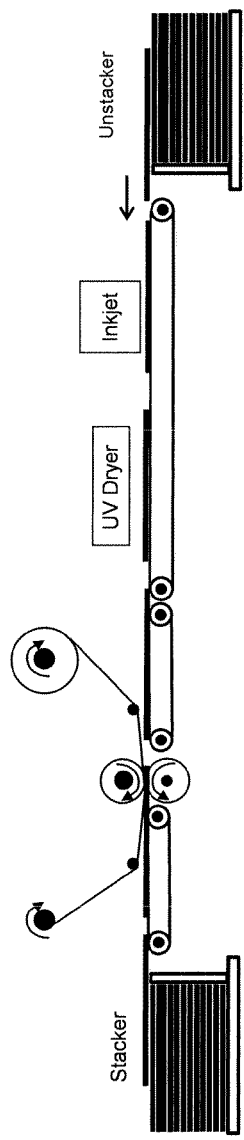
FIG. 2 illustrates the entire method according to some embodiments of the present invention.

By way of illustration and non-limiting, FIG. 2 illustrates the entire method according to some embodiments of the present invention. For the sake of illustration and simplification, the preparation step of the substrate and the printing step are combined here as they are conducted, in some preferred embodiments of the invention, in at least the same inkjet printing means. Upstream of the customization is shown a substrate unstacker while a substrate stacker is shown downstream. An optional, though preferred, drying step (for example by UV) of inks/varnish is also shown here as occurring prior to the gilding step.

Figures 3A, 3B:
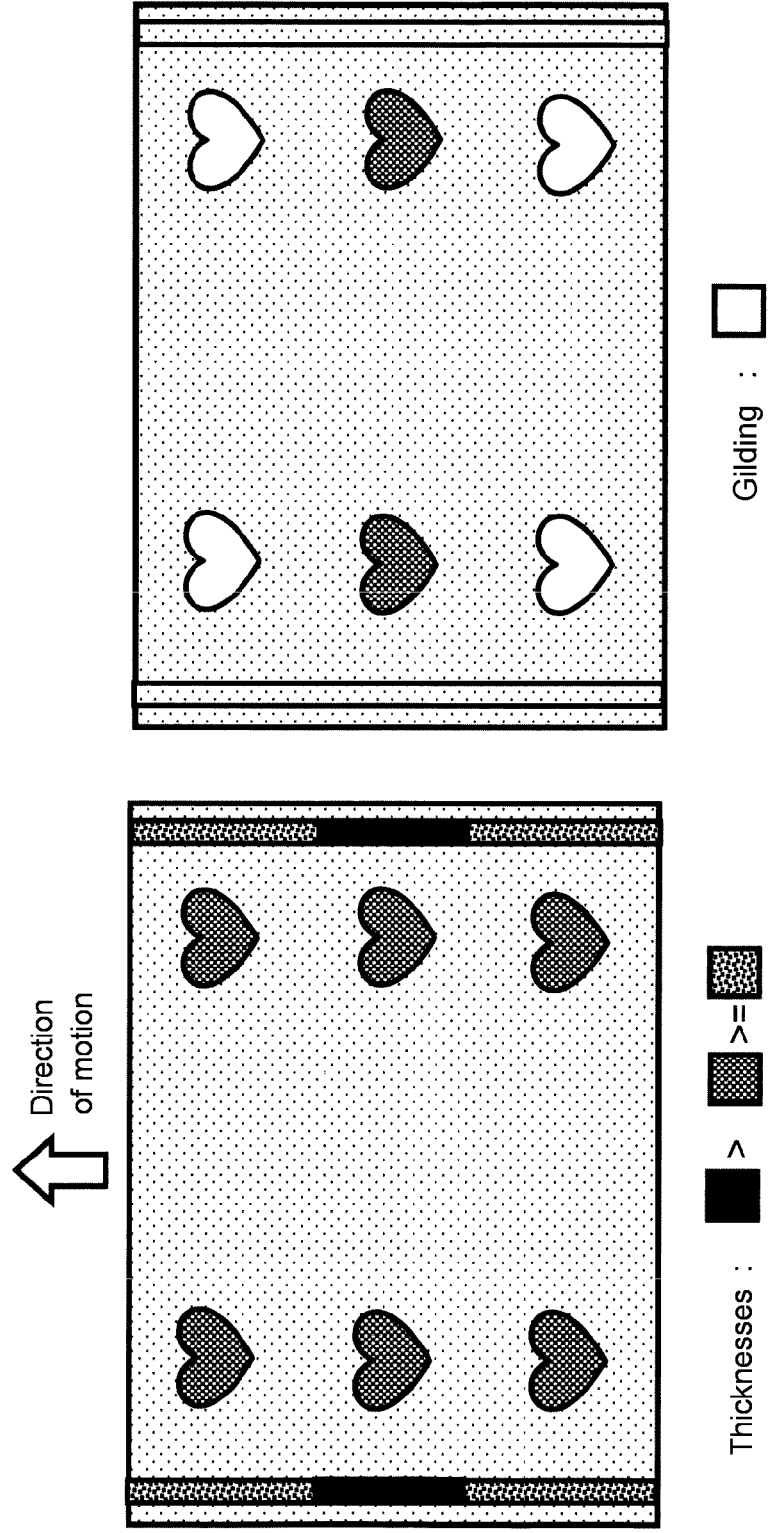

FIG. 3a illustrates, by way of illustration and non-limiting, deposit of material conducted in accordance with some embodiments of the present invention. In this illustration, the material (for example a varnish) used for the preparation step of the substrate is identical to that used for the printing of reliefs intended to receive the gilding coating (also called herein below covering or material or simply "gilding"), but this does not constitute a limitation of the present invention. Two beads of material having variable thickness can be seen on the two lateral edges of the substrate; in the direction of displacement of the substrate these beads have respectively a first thickness followed by a more substantial second thickness followed by a third thickness substantially identical to the first thickness. Six printed areas in relief in the form of a heart can also be observed.

By way of illustration and non-limiting, FIG. 3b illustrates the substrate of FIG. 3a after gilding step. This figure reveals two essential advantages of the present invention, specifically the non-contamination of the substrate by the gilding in the areas which are not in relief as well as the selective gilding of the areas in relief—in this illustration, the two hearts of the middle of the substrate—due to the variable thickness of the material arranged on either side of the substrate.

By way of illustration and non-limiting, FIG. 4a also illustrates deposit of material conducted according to the present invention. In this illustration, the material (for example a varnish) used for the preparation step of the substrate is identical to that used for printing the reliefs intended to cover the gilding, but this does not constitute a limitation of the present invention. Two beads of material having a substantially constant thickness can be seen on the two lateral edges of the substrate. A sun printed in relief having a center of thickness greater than the thickness of its ends can also be seen.

By way of illustration and non-limiting, FIG. 4b illustrates the substrate of FIG. 4a after gilding step. This figure also reveals two essential advantages of the present invention, specifically the non-contamination of the substrate by the gilding in those areas which are not in relief and the selective gilding of areas in relief—in this illustration, the center of the sun—by way of selection of a particular thickness of the material placed on either side of the substrate.

Material

The examples and/or details described in the present application are provided by way of illustration and non-limiting. In particular, the examples relating to the type of material used in terms of the present invention for the preparation step of the substrate must not be interpreted in a limiting way as one of the main advantages, at least at the physical/mechanical level, is that this material prevents contamination, by the gilding, of those areas which must remain intact, and allows the gilding to efficiently cover the printed areas in relief on which the gilding is to be deposited. It is evident however that the present invention gains many other advantages as a function of the selected embodiments such as described in the present description.

According to some embodiments of the present invention, said material is selected from inks and/or varnishes, preferably from inks and/or varnishes adapted to the method of inkjet printing.

According to some embodiments of the present invention, said material is selected from the inks and/or varnishes used during the printing step of the substrate by inkjet.

Therefore, according to some embodiments of the present invention the preparation of the substrate by addition of material is done by means of inkjet printing, for example by using the same printing means as those used for the printing step of the substrate by inkjet.

According to some embodiments of the present invention, said material is selected from at least one group of substances the nature of which optimises its "non-compatibility" with gilding. It is evident that in terms of the present invention, the term "non-compatibility" is generally used to mean that the gilding foil will tend not to stick to said material.

Preparation of the Substrate (e.g. Additional Step)

The preparation of the substrate (sometimes designated by "additional step" hereinbelow) by addition of material near the lateral edges of the substrate can be done prior to printing, after printing or preferably at the same time as printing and prior to or during the customization of the substrate by deposit of coating/gilding (in fact, the present application details deposit of ink or varnish or other material, prior to the deposit of gilding, but it is possible to consider the addition of non printed guide means, even though it is preferred to use the printing itself so as not to need modifying the printing machine expensively). The term "lateral edges" is used in the present application, in particular for the substrate, in reference to the direction according to which the gilding will be deposited. In fact, it is preferable that the preparation of the substrate is done transversally to the deposit of the gilding. In the same way, it is preferable that the preparation of the substrate is done on at least one area located near the contours of the substrate, but it is possible to consider any arrangement, as a function of the desired result.

Some embodiments of the present invention are based on preparation of the substrate by addition of material near the lateral edges of the substrate.

Any type of shape for this additional material can be imagined here obviously. Some non-limiting examples are points and/or continuous or discontinuous lines (generically called "beads" in the present description).

According to some embodiments of the present invention, the beads are positioned at a distance of fewer than two centimeters from the lateral edge of the substrate.

According to some embodiments of the present invention, the beads are positioned on the substrate itself.

According to some embodiments of the present invention, the beads are positioned in the so-called "technical" area, also known as "clamping area" or "reserved area" of the substrate. This is generally the area which can be gripped by the shifting means of the substrate via the printing device and/or which is generally cut after printing/gilding.

According to some embodiments of the present invention, the beads are placed near the two lateral edges of said substrate.

According to some embodiments of the present invention, when the beads placed near the two lateral edges of the substrate are discontinuous, they occupy an area the extent of which is adapted as a function of the positioning of the gilding on the printed areas, such as for example at least 1%, 5%, 10%, 25%, 50%, 75% or even 90% of the length of the lateral edges. By way of example, if the substrate requires, over a part of the length of the substrate, gilding along its straight lateral edge, it is preferred not to place a bead near this area.

There is virtually no limitation as to the width of the beads according to the present invention. However, a width less than 1 cm, 0.5 cm, 0.1 cm, 500 microns, or even less than 50 microns for example will be used to avoid wastage of material and of the substrate.

Areas Intended to be Provided with Coating/Gilding

The present invention therefore comprises a gilding step by contact of the areas of the substrate which present a relief following the printing of a pattern with at least one gilding device (e.g., a gilding foil).

There is virtually no limitation according to the present invention about the areas intended to be coated with a gilding foil. Yet, as already explained hereinabove, if areas intended to be coated with a gilding foil are located near the lateral edges of the substrate, it is preferred not to place a bead near these areas.

The printed areas to be coated with a gilding foil can occupy any surface of the substrate. The present invention is preferably used when the surface of the substrate to be coated by gilding represents less than 50% of the total surface of the substrate. Yet, it is possible to use the present invention beyond these limits, especially when the deposit gilding device has excessive suppleness to ensure that it will not reach the areas which not intended to receive gilding. It is also evident that the present invention preferably applies when the gilding deposit (or even pressing) device is rigid, even if the invention rightly allows a supper device to be used (while devices or systems of the prior art allow none of these options).

There is virtually no limitation according to the present invention about the minimal surface of the substrate to be coated by the gilding foil. However, in some embodiments the present invention will preferably be used when the surface of the substrate to be coated by the gilding represents more than 1% of the total surface of the substrate, for example more than 5% or even more than 10% and/or less than 90%, for example less than 50% and especially of the order of 10%.

Substrate

The substrate can be selected from a large range of material and not be considered as limited to those materials frequently used in standard printing and/or customization devices such as substrates of paper, cardboard and plastic. Non-limiting examples are metal, paper, non-woven fabric, plastic, for example methacrylic copolymer resin, polyester, polycarbonate, polyethylene, polypropylene, polystyrene and/or of polyvinyl chloride, or even materials of type cellulosic such as for example wood, plywood, or crystalline materials such as glass or ceramics, for example. The invention therefore also applies to any combination of these materials, such as for example complex materials comprising one or more of these components such as for example the milk cartons.

According to the present invention, the substrate (foil, card, etc.) is generally in a rectangular or square shape. This foil moves, generally by means of a transport system for substrates in a printing machine, along a transport path oriented according to a longitudinal axis from at least one input store providing the printable and/or customizable substrates, to at least one output store receiving the printed and/or customized substrates. As explained hereinabove the "lateral edges" of the substrate are therefore the two edges located on either side of this longitudinal axis; the front and/or rear edges are its transversal edges.

Material/Coating/Gilding

The present invention relates to a printing method and/or a printing system comprising a gilding of the substrate. Any gilding technique adapted to the method of the present invention can be used. However, according to some preferred embodiments of the present invention, the cold gilding technique also known as "cold foil transfer" is used.

So, according to some embodiments of the present invention, a gilding foil (therefore forming a part of the gilding device) is pressed against the areas of the printed substrate requiring deposit of said gilding. This contact between the gilding foil and the substrate is generally made by means of two cylinders between which the substrate and the gilding foil are placed into contact.

To ensure optimal detachment of the gilding film and its adhesion to the areas of the printed substrate, adhesive will preferably be used. This adhesive could be either positioned on the printed areas (prior to application of the gilding), or form an integral part of the gilding foil itself. In some embodiments adapted to the present invention, a gilding foil is used, which integrates an adhesive film (which will be pressed against the areas to be gilded) and adhesive (the same or different) is previously applied to the printed areas (prior to application of the gilding). In other embodiments of the present invention, an ink and/or a varnish used for printing already give to the areas intended to be coated with gilding an adhesive property; this latter option is particularly advantageous as it avoids adding adhesive to the areas to be gilded and/or it allows using gilding foils exempted of adhesive film.

Finally, according to some embodiments the gilding technique can also comprise an activation step (for example by means of UV rays) for crosslinking the ink and/or the varnish and/or the adhesive and accordingly improving adhesion between the gilding foil and the areas in relief of the substrate.

It is evident for the person skilled in the art that the words "gilding" and "gild" used in the present invention are not limited to use of gold foil and that any "gilding" device can be used. These terms naturally cover all types of decorative foils (sometimes also called metallic foils) illustrative and non-limiting examples of which are aluminium, chrome, gold, silver, copper or even optically active metal salts. In general, a gilding foil pressed against the substrate to be customized is used, and the present application therefore designates by this term the general use of a gilding device.

The gilding foils used within the scope of the present invention are generally provided in the form of rolls of width substantially equivalent to the transversal dimension of the substrate.

The gilding foils used within the scope of the present invention generally comprise several superposed films. Non-limiting, non-exhaustive examples in the order of application to the substrate to be gilded are:

- a film of adhesive. This film can comprise any type of resin and/or wax and/or filler and can also transit to an adhesive state under the effect of thermal treatment. It can have a thickness which is generally between 0.5 and 5 microns; and/or
- at least one gilding film, and
- a protective film also called lacquering and/or colour (which can also comprise any type of dye and/or pigment and/or matting or shining agent). This protective film can be characterized by many properties as a function of preferred use, whether properties of chemical and/or physical resistance; and/or
- a de-adhesion film also called release ("release layer"). This film is generally very thin (having a thickness usually less than 0.1 micron) and it can consist by way of example of resins and/or of waxes soluble in solvents; and/or
- a so-called transport layer which enables transport of the gilding foil. This layer has a thickness which is generally between 5 and 50 microns and generally consists of polyester films.

Printing of Substrate in Relief, Especially by Inkjet

The printing method according to the present invention generally relates to printing substrate by inkjet which puts into relief areas intended to be coated with a gilding foil. Inkjet printing is well known to the person skilled in the art.

The areas can be any sort of shapes, for example points, letters and/or any other geometric shapes. They can consist of different materials, for example inks and/or varnishes. They can also be coated with a layer of material, for example coated with adhesive, prior to the gilding step; yet, according to some embodiments of the present invention the gilding step is performed directly on the ink and/or the varnish deposited by inkjet.

The relief of said areas intended to be coated with a gilding foil preferably represents a thickness of the order of a micron, for example greater than five microns, preferably greater than ten microns, or even greater than 15 microns.

Finally, the thickness of the material added near the lateral edges of the substrate is generally calculated as a function of the value of the thickness of the gilding.

Even though in theory there is no maximal thickness of the relief for said areas, in general it is preferred to limit the thickness of the areas in relief to a value of 500 microns, preferably less than 300 microns, but current techniques still allow to produce thicknesses of the order of a millimeter, or even several millimeters and it is clear that the present invention is not limited to these examples.

It is clear from the above that the present invention also relates to at least one device (or system) of printing and/or of customization comprising means for executing at least one of the methods described in the present application. Due to functional considerations provided in the present application, it is clear that such systems or devices comprise means for accomplishing the functions described in reference to the method and that it is not necessary to detail these means.

The present application describes various technical characteristics and advantages in reference to the figures and/or to various embodiments. The person skilled in the art will understand that the technical characteristics of a given embodiment can in fact be combined with characteristics of another embodiment unless otherwise specified or it is evident that these characteristics are incompatible or the combination does not provide a solution to at least one of the technical problems mentioned in the present application. Also, the technical characteristics described in a given embodiment can be isolated from the other characteristics of this mode unless otherwise specified.

It must be evident for person skilled in the arts that the present invention allows embodiments in many other specific forms without departing from the field of application of the invention as claimed. Consequently, the present embodiments must be considered by way of illustration, but can be modified in the field defined by the scope of the appended claims, and the invention should not be limited to the details given hereinabove.

The invention claimed is:

1. A printing method comprising:
a printing step of a substrate by inkjet which puts in relief areas which are intended to be coated with a gilding foil,
a consecutive gilding step by contact between these relief areas of the substrate and a gilding foil, and
prior to the gilding step, a preparation step comprising preparation of the substrate by addition of material outside the relief areas and whose thickness of added material is constant or variable to avoid the contamination of the substrate by the gilding foil in the areas that are not in relief.

2. The method according to claim 1, wherein the minimum thickness of the material added is a micron.

3. The method according to claim 1, wherein the material added is selected from inks and/or varnishes.

4. The method according to claim 1, wherein the material added is selected from inks and/or varnishes used during the printing step of the substrate by inkjet.

5. The method according to claim 1, wherein the preparation step is conducted by means of inkjet printing.

6. The method according to claim 1, wherein the preparation step is conducted in the form of beads.

7. The method according to claim 1, wherein the preparation step is conducted in a technical area, a clamping area or a reserved area of the substrate.

8. The method according to claim 1, wherein the substrate is selected from papers, cardboards and plastics, or from complex materials comprising one or more of these components.

9. The method according to claim 1, wherein the minimum thickness of the material added is greater than five microns.

10. The method according to claim 1, wherein the minimum thickness of the material added is greater than ten microns.

11. The method according to claim 1, wherein the minimum thickness of the material added is greater than fifteen microns.

12. The method according to claim 1, wherein the preparation step is conducted by means of inkjet printing by using the same printing means as those used for the printing step of the substrate by inkjet.

13. The method according to claim 1, wherein material addition is performed at a distance of fewer than two centimeters from the lateral edge of the substrate.

14. The method according to claim 1, wherein the maximum thickness of the relief areas is 500 microns.

15. The method according to claim 1, wherein the maximum thickness of the relief areas is 300 microns.

* * * * *